United States Patent [19]
Lenhart

[11] Patent Number: 5,609,237
[45] Date of Patent: Mar. 11, 1997

[54] CYLINDRICAL OBJECT TIPPING DEVICE AND METHOD

[75] Inventor: Ronald A. Lenhart, Lakewood, Colo.

[73] Assignee: Simplimatic Engineering Company, Lynchburg, Va.

[21] Appl. No.: 352,367

[22] Filed: Dec. 9, 1994

[51] Int. Cl.[6] .................................................. B65G 47/24
[52] U.S. Cl. .......................... 198/406; 198/417; 198/493
[58] Field of Search .................................... 198/417, 406, 198/405; 193/46, 47; 406/87, 195

[56] References Cited

U.S. PATENT DOCUMENTS

| | | |
|---|---|---|
| 1,277,782 | 9/1918 | Tucker . |
| 1,290,055 | 1/1919 | Biggs . |
| 1,576,338 | 3/1926 | Ladd .................................. 198/417 X |
| 1,850,067 | 3/1932 | Ayars . |
| 2,583,313 | 1/1952 | Albertoli ............................ 198/417 X |
| 2,662,631 | 12/1953 | Kraus et al. . |
| 3,314,522 | 4/1967 | Croall . |
| 3,446,334 | 5/1969 | Donner .................................... 198/417 |
| 3,489,261 | 1/1970 | Croall et al. . |
| 3,767,028 | 10/1973 | Rosso . |
| 3,828,921 | 8/1974 | Tackett, Jr. ......................... 198/493 X |
| 4,098,391 | 7/1978 | Hernandez ............................. 198/417 |
| 4,479,574 | 10/1984 | Julius et al. ........................... 198/626 |
| 4,492,299 | 1/1985 | McLeod ................................ 198/417 |
| 5,097,943 | 3/1992 | Kawasaki et al. ................... 198/417 X |

FOREIGN PATENT DOCUMENTS

| | | | |
|---|---|---|---|
| 0390256 | 10/1990 | European Pat. Off. ............... | 198/417 |
| 0089722 | 3/1990 | Japan ....................................... | 406/87 |

Primary Examiner—D. Glenn Dayoan
Attorney, Agent, or Firm—Fields & Johnson, P.C.

[57] ABSTRACT

A tipping device includes a plurality of upper rod sections which curve to cause the tipping of the container from the vertical to the horizontal, and a single lower straight rod which does not bend or otherwise follow any curved path with respect to the tipping angle of the container. A plurality of spaced vertical plates are arranged along the length of the device to provide structural support to the rod sections. The vertical plates have an interior section that is cut out to conform to the shape of the cylindrical container passing therethrough. The vertical plates are mounted upon a deck that extends the length of the device. A container enters the device at the upstream end of the device by a conveyer. At the downstream end of the device is another conveyor for discharge of the containers. A plurality of blower jets are positioned along the length of the device which cause air to strike against the containers to provide a downstream force to move them through the tipping device to the downstream end. A method is provided which discloses a single file row of containers being tipped sequentially to the desired orientation by rotation of the closed heavier end about an axis defined by the straight member as the containers are moved from the upstream location to the downstream location.

13 Claims, 4 Drawing Sheets

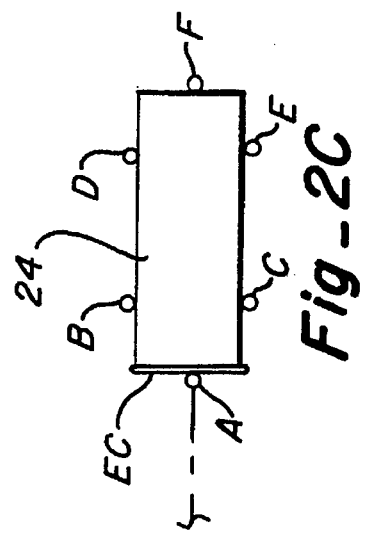
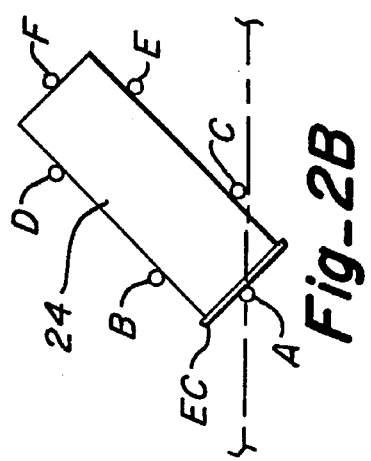
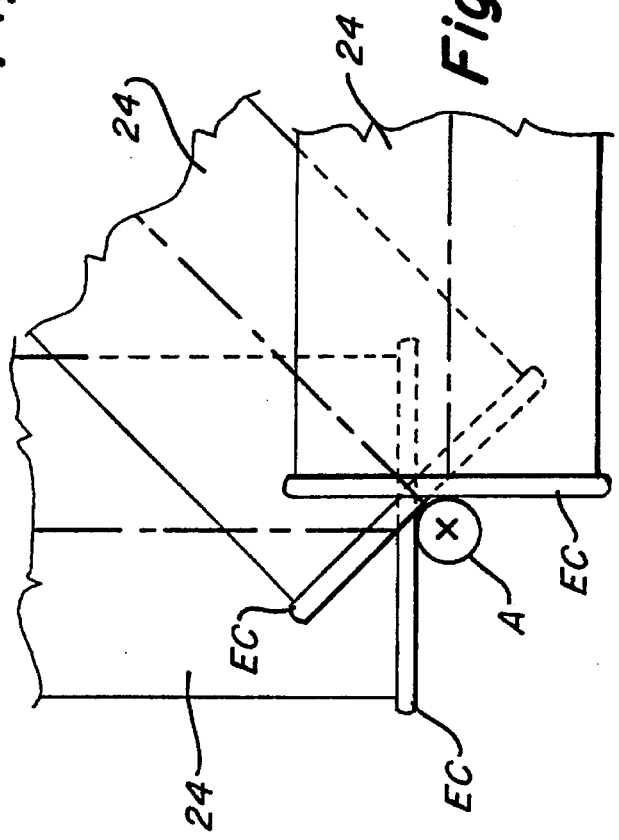
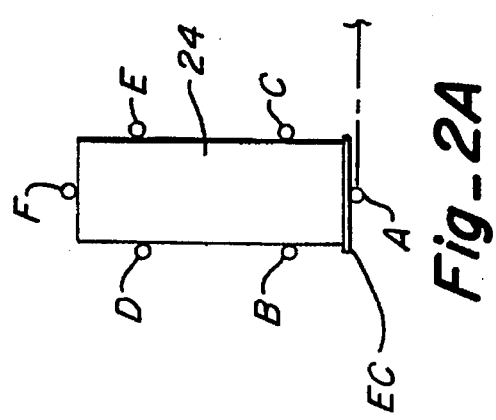

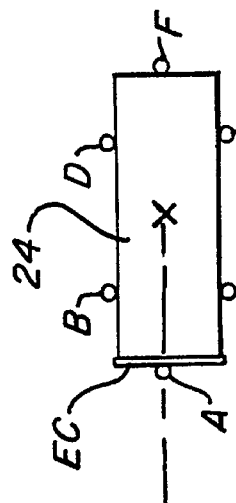
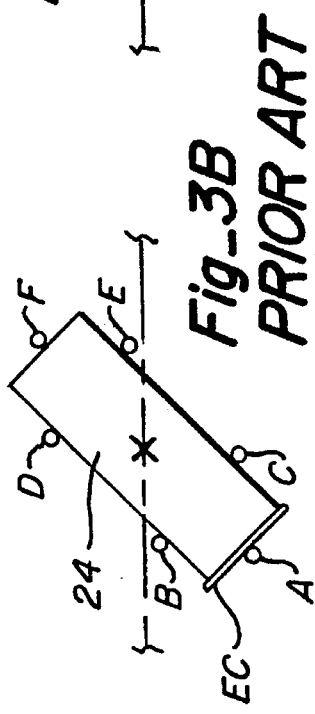
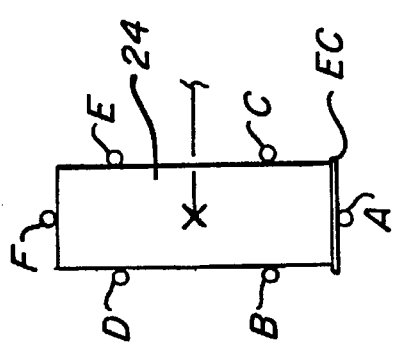
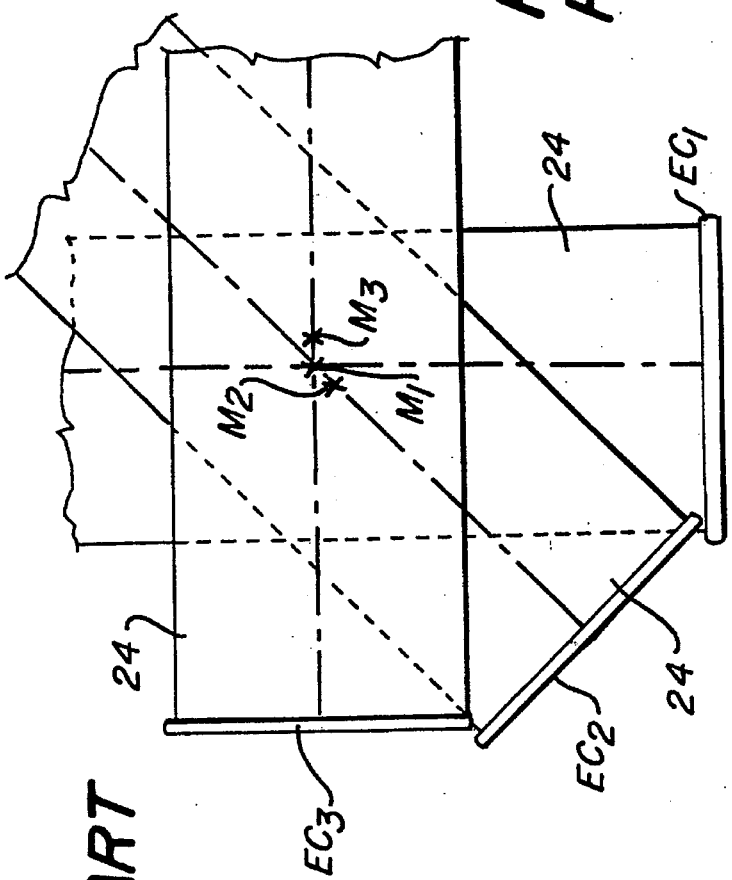

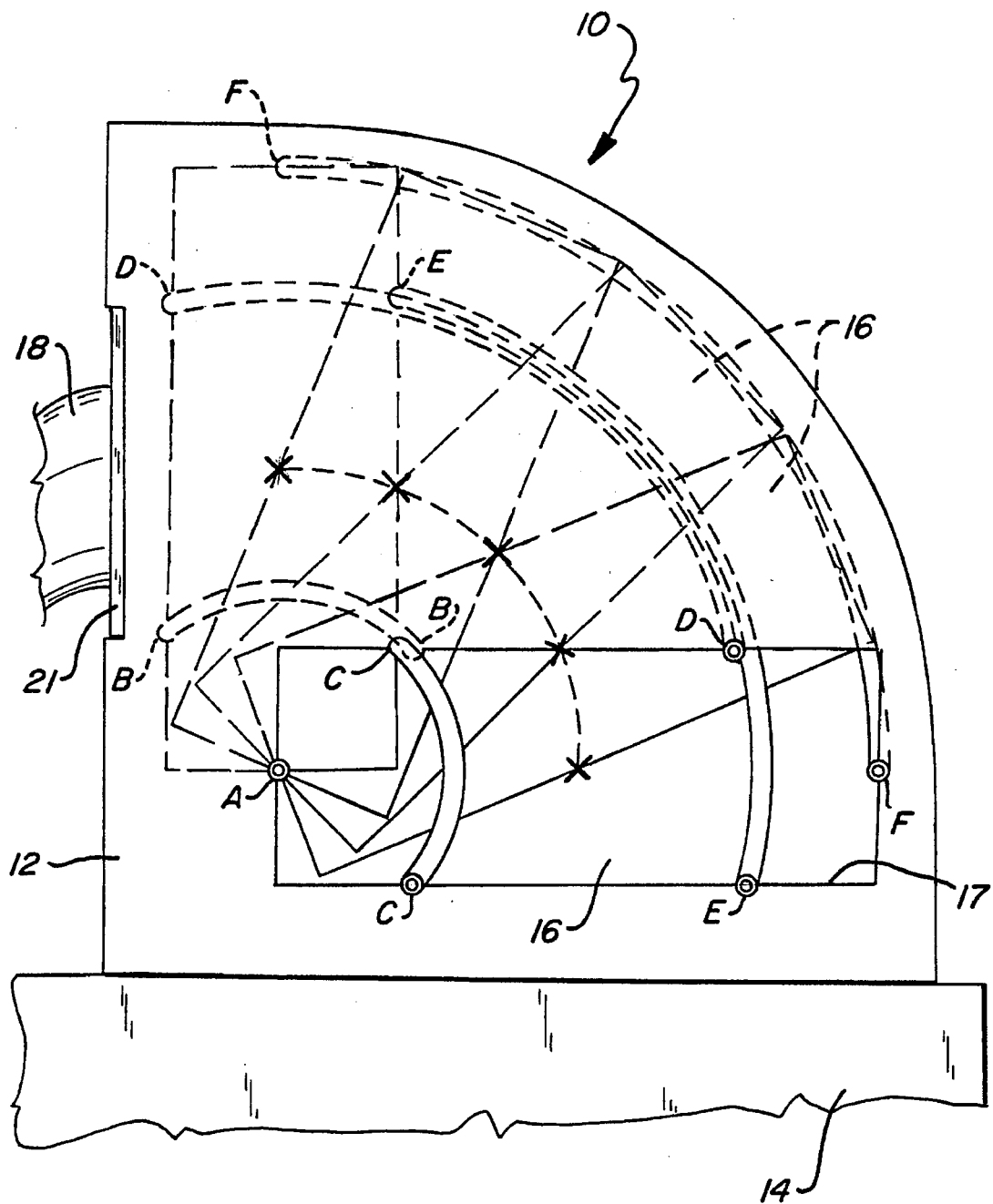
Fig_4

CYLINDRICAL OBJECT TIPPING DEVICE AND METHOD

TECHNICAL FIELD

This invention relates to a device for moving empty cylindrical articles such as food or beverage containers, in single file and sequentially rotating them from a vertical position at an upstream location to a horizontal position at a downstream location, or vice versa, in which the movement of the containers can be controlled to minimize damage and jamming of the containers along the path of movement.

BACKGROUND ART

It is often necessary in a container manufacturing plant to rotate or turn containers from a vertically aligned position to a horizontally aligned position, or vice versa, in order that the containers may be oriented properly for procedures such as rinsing, coating, and/or printing. One problem associated with conventional rotating devices is that the containers often become jammed as they are rotated resulting in damage to the containers and possible damage to the rotating device.

There are a number of prior art devices for rotating a container. Although these prior art devices may differ in many respects, one thread of continuity running throughout all these prior art devices is that when a system of rods or rails are used to rotate the container, each rod or rail is bent along its length to create the path of movement for the container. Accordingly, the axis of rotation of the container is at the center of mass of the container as it moves to the rotated position.

Typically, many food containers have a cylindrical wall portion and a flanged end cap which attaches to and closes one end of the cylindrical wall portion of the container. The end caps are of greater diameter than the wall portion of the containers. When the containers are in upright side-by-side arrangement, the larger diameter of abutting end caps of adjacent containers creates a space between the cylindrical wall portions of the adjacent containers. During rotation as by the prior art, because there is some amount of clear space between the containers and the rotating device, the containers become slightly misaligned in relation to one another. Accordingly, adjacent end caps tend to ride up on each other and come into contact with the cylindrical wall portion of an adjacent container. This contact causes the adjacent end caps to interfere with each other during rotation. Because most manufacturers desire containers to be processed in a quick and efficient manner, high speed handling of the containers is required. This high speed requirement compounds the problems of jamming and damage to the containers normally encountered even at lower speeds.

Another problem associated with the prior art is that when a container is rotated about its center of mass, the contact between the cylindrical wall portions of the containers as they are rotated results in friction which resists rotation of the containers. Accordingly, a container rotated about its center of mass can result in jamming of the containers due to the undue friction between the containers. Typically, in a container manufacturing plant, the top end of the container is left open to allow whatever product is to be placed in the container at a later time. For both flanged closed end containers and other containers in a manufacturing plant that have a closed bottom end, this bottom end is heavier than the open top end. As a container is rotated about its center of mass such that the heavier bottom end is raised, the lighter top ends of the containers can be compressed against one another such that the top ends become deformed in an elliptical or oblong shape because of the large amount of force required to lift the heavy lower end of the container to rotate it. This deformation can result in jamming and damage to the containers as they are being rotated.

One example of a prior art device that rotates a container along its center of mass is found in U.S. Pat. No. 3,314,522 to Croall. As is typical with the other prior art devices, this reference shows a plurality of rods or rails which all have a curved shape along their length which defines the turning movement of the container along its center of mass. This device incorporates a series of rod-like guides which then communicate with conventional rails once the container has achieved its rotated position.

Other examples of the prior art include U.S. Pat. No. 3,767,028 to Rosso, and U.S. Pat. No. 1,277,782 to Tucker. In these prior art devices, the same manner of rotation is found in which the container is rotated along an axis aligned with the center of mass of the container. These devices incorporate a combination of rods and/or flat surfaced rails which achieve the rotation.

None of these prior art devices provide for tipping a container to a desired position about its lower end which overcome the problems of flanged end-type containers riding up on one another, undue friction between the cylindrical walls of containers, and deformation of the upper end of open containers.

DISCLOSURE OF THE INVENTION

In accordance with this invention, a cylindrical object tipping device is provided for moving cylindrical articles, such as containers, in single file from a vertically aligned position at an upstream location to a horizontally aligned position at a downstream location. Although tipping the container from a vertical position to a horizontal position is described herein, it will be understood that the same device claimed herein can be used to tip a container from a horizontal position at the upstream location to a vertical position at the downstream location or any other angular tipping of a container from an upstream location to a downstream location.

The tipping device of this invention includes a plurality of upper rod sections which curve to cause the tipping of the container from the vertical to the horizontal, and a single lower straight rod which does not bend or otherwise follow any curved path with respect to the tipping angle of the container. A plurality of spaced vertical plates are arranged along the length of the device to provide structural support to the rod sections. The vertical plates have an interior section that is cut out to conform to the shape of the cylindrical container passing therethrough. The vertical plates are mounted upon a deck that extends the length of the device. A container enters the device at the upstream end of the device by means of a conveyer. At the downstream end of the device is another conveyor for discharge of the containers. A plurality of blower jets are positioned along the length of the device which cause air to strike against the containers to provide a downstream force to move them through the tipping device to the downstream end.

The primary novel feature of this device is that the containers are tipped about an axis defined by the straight rod, and not through an axis located near the center of mass. Thus, the turning of the containers by the device and method of this invention is more appropriately defined as a tipping motion as opposed to true rotation about the containers' center of mass. The straight rod is positioned so that the lower closed heavy end of the containers is in contact with the rod along the diameter of the flanged end. With the axis of rotation located at the closed end of the containers and this end is flanged, the flanged ends are kept in uniform spacial relationship with one another, thus eliminating the tendency of the containers to ride up on one another and interfere with each other during rotation, as is the case with the prior art devices. Thus, the containers more freely travel downstream while sequentially rotating from a vertical position to a horizontal position, substantially minimizing damage to the containers and reducing jamming. The weight of the container combined with the directed air provided by the blower jets ensures that the center of the lower flanged ends of each of the containers maintain contact with the straight rod throughout rotation, thus ensuring the containers do not ride up on one another.

Another advantage of the device and method disclosed herein is that friction between containers being tipped can be reduced, which in turn results in reduced jamming of the containers. That is, since the containers are tipped about their lower ends, the only surface in contact between containers having flanged type ends are the flanges. These flanges generally have a lower coefficient of friction than do the cylindrical walls which greatly aids in efficient tipping of the containers to a desired position. Even with containers not having a flanged type end, the friction is still reduced because the closed ends of the containers are generally stiffer than the cylindrical wall portions of the containers which results in a minimum contact area between the containers as they are tipped.

Yet another problem solved with the device and method of this invention is that open top containers have a reduced tendency to become deformed as the containers are tipped to a desired position. Reduced deformation occurs because the heavier bottom end of the containers remain at a constant elevation with respect to the center area of the containers, and since the heavy bottom end does not have to be raised as in the prior art, the upper open end of the containers do not experience as much deforming pressure.

The positioning of the spiral upper rods and the lower straight rod may be configured to match any shaped container. Depending upon the size and configuration of the flanged end found on the container, the clear space between the container and the rods as the container moves through the device may be adjusted to ensure maximum efficient travel without container damage and jamming.

As a result of the apparatus disclosed herein, a method is also provided for tipping a container in which the container rotates about an axis located at one end of the container as opposed to another axial location.

The apparatus and method disclosed herein provides superior control over that which is possible with conventional apparatus and methods that include the use of spiral members to achieve tipping of a container. Additionally, a tipping device is provided that can be operated at high speeds wherein damage to the containers is minimized and jamming is substantially reduced.

Additional advantages of this invention will become apparent from the description which follows, taken in conjunction with the accompanying drawings.

BRIEF DESCRIPTION OF THE DRAWINGS

FIGS. 2A–2C illustrate a container having a flanged end cap which is tipped by the tipping device of FIG. 1, the figures depicting a side view of the container as it is tipped from an upstream to a downstream location;

FIG. 2D is an end view of the containers in FIGS. 2A–2C which shows the container being tipped about a lower guide rod having a center axis wherein the end caps of the containers maintain aligned contact with one another throughout rotation;

FIGS. 3A–3C are similar to FIGS. 2A–2C, but show a prior art device which rotates a container generally about a center of mass. A longitudinal axis through the center of mass of the containers slightly changes location throughout rotation depending upon the amount of clear space between the rods and the container, the containers being rotated such that the guide rods all have a curved shape conforming to the container passing therethrough;

FIG. 3D is an end view of a container that is rotated by a prior art device wherein the end caps of the containers are allowed to ride up on one another throughout rotation due to the slight change in location of the axis of rotation defined by the center of mass M. The center of mass is shown in three differing locations as the container is rotated from the vertical position to the horizontal position; and FIG. 4 is an end view of a vertical plate of this invention showing a schematic representation of a container that tips about the axis defined by the lower guide rod.

BEST MODE FOR CARRYING OUT THE INVENTION

Figure 1:
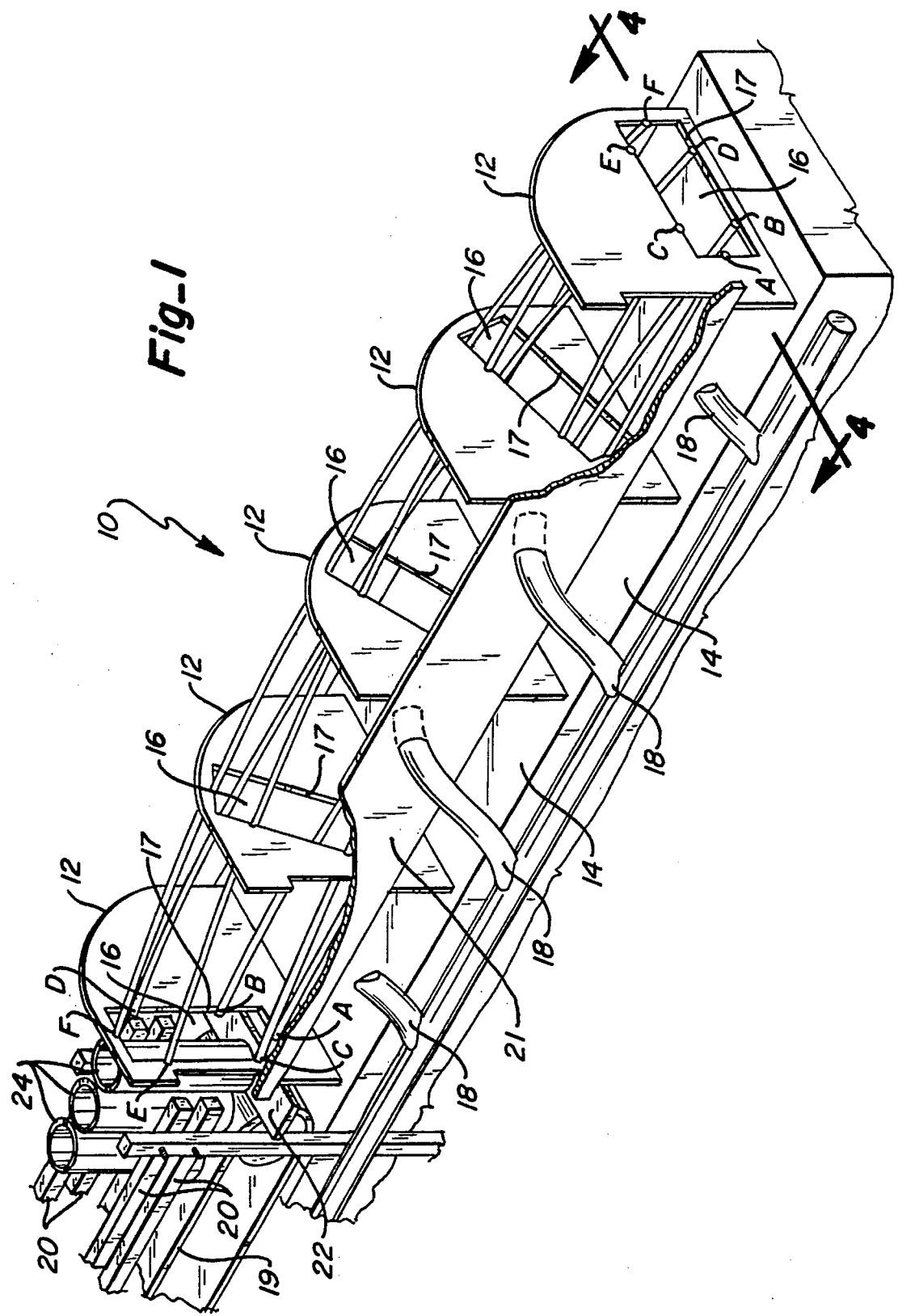
FIG. 1 is a perspective view of a cylindrical object tipping device constructed in accordance with this invention.

In accordance with this invention, as shown in FIG. 1, a cylindrical object tipping device 10 is provided which includes a single straight lower guide rod section A and a plurality of spiral rods, illustrated as rods B, C, D, E and F. Rods A–F are arranged in spaced relation such that a container following the internal path of the spiral sections moves from an upstream vertical position to a downstream horizontal position. Laterally spaced along the lengths of rods A–F are a plurality of vertical plates 12 mounted upon a deck 14 which extends the length of the rod sections wherein the plates provide support to the rods arranged in the described relationship. The vertical plates 12 include an interior cut out portion 16 that corresponds to the shape of the cylindrical container to pass therethrough. The plurality of rods A–F attach to the respective vertical plates 12 along the interior cut out edge 17 of each plate. A plurality of blower jets 18 mounted on support wall 21 provide a stream of air that forces the containers through the device from the upstream end to the downstream end. The speed of travel of the containers through the device can be controlled by the angle and intensity in which the stream of air contacts the containers along with the severity of the spiral formed by the rods.

The upstream end of the device 10 communicates with a conveying device, such as conveyor 19 shown in FIG. 1. A pair of guide rails 20 on the opposite sides of conveyor 19 position the containers in an upright vertically aligned position. Depending upon the type of conveyor used, a skid plate 22 may be used to provide a means for which to introduce the containers into the device. At the downstream end of the device, another conveying device (not shown) is used to continue to move the containers in the downstream direction to the next manufacturing line procedure.

As shown in FIGS. 2A–2D, jamming and damage to the containers can be substantially reduced by tipping the container about an axis defined by straight rod A. As shown, the end cap EC at the lower closed end of the container rests on straight rod A. FIGS. 2A–2C illustrate a container 24 whose end cap EC engages and tips about rod A along the path of rotation. FIG. 2A illustrates a container as it enters the device 10. FIGS. 2B and 2C show the tipping about rod A of container 24 as the container moves to a downstream location. FIG. 2D is an end view illustrating container 24 as it tips from the positions as shown in FIGS. 2A–2C. The lower closed end of the container is heavier than the upper open end even if it does not include an end cap. Thus, this relatively heavy end rests on rod A as the lighter upper end of the container tips over during movement through the tipping device from the upstream location to the downstream location.

FIGS. 3A–3D correspond to FIGS. 2A–2D but illustrate a container 24 having a closed relatively heavy end with an end cap EC rotated by conventional prior art methods wherein the axis of rotation is located at the center of mass of the container, the center of mass M tending to slightly change positions during rotation due to the corresponding open space between the rods or rails and the containers passing therethrough. As shown in these figures, the end caps of the containers are allowed to freely ride up on one another which causes damage and jamming of the containers. As shown in FIG. 3D, the center of mass M changes locations, this change in location being illustrated as center of mass $M_1$, $M_2$ and $M_3$ corresponding to end cap $EC_1$, $EC_2$ and $EC_3$ as the container is rotated from the vertical to the horizontal.

Additionally, the lower closed ends must be lifted in order to rotate the containers about the center of mass. This requires additional force on the containers in the downstream direction to provide this lifting force. As a result, the upper open ends are deformed and more likely to jam. Also the increased downstream force creates greater friction between the containers, thereby adding to the jamming problem.

FIG. 4 is an end view further illustrating the tipping about rod A. Because damage and jamming can be substantially eliminated by use of the invention disclosed herein, the speed at which containers can be tipped in a manufacturing process is greatly enhanced.

Although the embodiment disclosed herein illustrates a container being tipped from a vertically aligned position to a horizontally aligned position, it will be understood by those skilled in the art that a container may also be tipped from the horizontal to the vertical or any other angular tipping position using the same structure and method heretofore described. Accordingly, the blower jets can be appropriately aligned such that the containers are urged from an upstream location to a downstream location.

It will also be understood that the apparatus and method disclosed herein is not limited to the tipping of a container in a horizontal plane. For example, the container also may be raised or lowered to a desired elevation as it is tipped. This can be achieved by maintaining rod A in a straight line position relative to the direction of horizontal movement, such that the container continues to rotate about the axis defined by rod A. That is, rod A is straight with respect to a line in the horizontal direction, but may be raised or lowered in the vertical direction to accommodate the needed elevation change. The blower jets may be utilized to accommodate the needed force in order to manipulate the travel of the containers through the device from an upstream location to a downstream location.

From the foregoing, the advantages of this invention are readily apparent. A simple yet efficient tipping device has been provided for moving containers therealong from a vertical to a horizontal position, or vice versa. The problem of containers having flanged end caps that ride up on one another can be substantially reduced by utilizing the invention disclosed herein. The additional problems of undue friction between containers causing jamming and deformation of the upper ends of open containers also resulting in jamming is substantially eliminated. Additionally, the apparatus and method disclosed herein also enables a container to be raised or lowered to the desired elevation while being tipped to the desired position.

It will be understood by those skilled in the art that while the invention described herein has particular application for containers having flanged end caps, the invention can also be used for tipping containers having other configurations, such as bright beverage containers, the invention generally providing a simple and efficient means to handle containers of all shapes and configurations.

This invention has been described in detail with reference to a particular embodiment thereof, but it will be understood that various other modifications can be affected within the spirit and scope of this invention.

I claim:

1. A device for sequentially tipping containers to a desired orientation as they move in single file from an upstream location to a downstream location, said device comprising:

a straight member extending through said device from said upstream location to said downstream location;

a plurality of spiral members extending through said device from said upstream location to said downstream location arranged in spacial relationship with said straight member forming an interior open space corresponding to the shape of the containers passing therethrough, the containers being rotatable about an axis defined by said straight member to tip the containers to the desired orientation;

means for supporting said straight member and said spiral members;

means for moving the containers from the upstream location to the downstream location; and wherein said straight member and said plurality of spiral members include rods having substantially circular cross-sectional shapes.

2. Apparatus, as claimed in claim 1, wherein said means for supporting includes:

at least one support attached to said straight member and said plurality of spiral members to provide support to the arranged shape of the members as the containers pass therethrough, said support having an interior cut out corresponding to the interior open space formed by the arrangement of the straight member and spiral members.

3. Apparatus, as claimed in claim 2, wherein said support includes:

a plate having an interior edge defining said cut out which conforms to the arranged shape of the straight member and spiral members passing therethrough, said straight member and said spiral members attached to said plate along said interior edge.

4. A device for sequentially tipping containers, having a closed first end and an open second end, to a desired orientation as they move in single file from an upstream location to a downstream location, said device comprising:

a straight member extending through said device from the upstream location to the downstream location;

a plurality of spiral members extending through said device from the upstream location to the downstream location arranged in spacial relationship with said straight member forming an interior space corresponding to the shape of the containers passing therethrough, the containers being rotatable about an axis defined by said straight member to tip the containers to the desired orientation;

a plurality of support members attached to said straight member, said plurality of spiral members providing support to the arranged shape of the members as the containers pass therethrough, said plurality of support members being spaced along the length of the device wherein said plurality of support members include an interior cut out corresponding to the interior open space formed by the arrangement of the straight and spiral members; and a plurality of blower jets positionable adjacent to said plurality of support members, said blower jets providing a stream of air in order to move the containers from the upstream location to the downstream location.

5. A method for sequentially tipping containers to a desired orientation as the containers move in a single file from an upstream location to a downstream location, said method comprising the steps of:

providing a plurality of spiral shaped members having an open space arranged therebetween to conform to the shape of a container passing therethrough;

providing a straight member in spacial communication with the spiral shaped members;

introducing a container to be tipped into the open space between the straight member and spiral members;

moving the container through the open space between the spiral members and straight member from the upstream location to the downstream location by a stream of air;

tipping the container about an axis defined by the straight member to achieve the desired orientation while moving the container from the upstream location to the downstream location; and removing the container from the open space between the spiral members and straight member after the container has achieved the desired tipped orientation.

6. A method for tipping containers having flanged end caps to a desired orientation as the containers move in single file from an upstream location to a downstream location, said method comprising the steps of:

providing containers each having at least one flanged end that is of a larger diameter than the diameter of each of the containers at their midpoints;

providing an apparatus to tip the containers to a desired orientation;

introducing the containers into the apparatus at the upstream location wherein the containers make contact with one another at their flanged ends;

tipping the containers about an axis juxtaposed to the lower edge of the flanged end of each of the containers as they move from the upstream location to the downstream location;

maintaining alignment between the containers as they are moved from the upstream location to the downstream location wherein the flanged ends of each of the containers remain as points of contact between the containers as they are moved; and removing the containers from the apparatus at the downstream location after the containers have achieved the desired tipped orientation.

7. A method, as claimed in claim 6, wherein said tipping step further includes:

moving the container from the upstream location to the downstream location by a stream of air.

8. A method for sequentially tipping a single file row of containers having a first closed heavier end and a second lighter open end as the containers sequentially move from an upstream location to a downstream location, said method comprising the steps of:

moving a single file row of containers sequentially from an upstream location to a downstream location;

maintaining alignment between each of the containers as they are moved from the upstream location to the downstream location wherein the first closed heavier ends of adjacent containers maintain contact; and sequentially tipping each container about a longitudinal axis located at the closed heavier end of each of the containers as they are moved from the upstream location to the downstream location.

9. A method, as claimed in claim 8, wherein said tipping step further includes;

moving the container from the upstream location to the downstream location by a stream of air.

10. In combination, a plurality of lightweight containers, each having a side wall extending from a bottom surface thereof, and a device for sequentially tipping said lightweight containers to a desired orientation as they move in a single file from an upstream location to a downstream location, said combination comprising:

a straight member extending through said device from the upstream location to the downstream location, a plurality of spiral members extending through said device from the upstream location to the downstream location and arranged adjacent said straight member forming an interior open space enabling said lightweight containers to pass therethrough, said containers being rotatable about an axis defined by said straight member to tip the containers to the desired orientation;

at least one support attached to said straight member and said plurality of spiral members to provide support to the straight member and plurality of spiral members as the containers pass therethrough, said support having an interior cutout corresponding to the interior open space formed by the arrangement of the straight member and spiral members; and a plurality of blowers positionable adjacent to said at least one support, said blowers providing a stream of air directed against said side walls of said lightweight containers in order to move said containers uniformly from the upstream location to the downstream location.

11. An apparatus, as claimed in claim 10, wherein said straight member and said plurality of spiral members include rods having substantially circular cross sectional shapes.

12. An apparatus, as claimed in claim 10, wherein said at least one support includes:

a plate having an interior edge defining said interior cutout which conforms to the arrangement of said straight and spiral members.

13. A method for sequentially tipping containers to a desired orientation as the containers move in single file from an upstream location to a downstream location, said method comprising the steps of:

providing a plurality of spiral shaped members having an open space arranged therebetween to conform to the shape of a container passing therethrough;

providing a straight member in spatial communication with the spiral shaped members;

maintaining the plurality of spiral shaped members and the straight member in a stationary position;

introducing a container into the open space between the spiral members;

moving the containers from the upstream location to the downstream location by a stream of air;

tipping the container about an axis defined by the straight member to achieve the desired orientation while moving the container from the upstream location to the downstream location; and removing the container from the open space between the spiral members after the container has achieved the desired orientation.

* * * * *